INVENTOR
WILLIAM D. FLETCHER III
BY John F. Carney
ATTORNEY

United States Patent Office 3,578,564
Patented May 11, 1971

3,578,564
DOUBLE CONTAINER REACTOR VESSEL
William D. Fletcher III, Hartford, Conn., assignor to Combustion Engineering, Inc., Windsor, Conn.
Filed Oct. 31, 1968, Ser. No. 772,304
Int. Cl. G21c 13/02
U.S. Cl. 176—87                                4 Claims

ABSTRACT OF THE DISCLOSURE

Means for suspendedly mounting a double container reactor vessel within a vessel cavity formed in a foundation structure in a manner such that, in the event of failure of the outer vessel in any location, the inner vessel will remain secured to the foundation structure. The means comprises the provision of radial flanges on the shells and closure covers of the inner and outer container vessels arranged such that the inner vessel flanges are retained in sandwiched relation between the opposing faces of the outer vessel flanges. Annular shoulder means are provided on the foundation wall to vertically support the assembled vessel structure by engagement with the outer vessel shell flange. An annular lock ring releasably attached to the foundation presents a bearing face adapted to engage the outer vessel closure cover flange to prevent upward movement of the retained flanges in the event of a reactor accident.

BACKGROUND OF THE INVENTION

In conventional nuclear reactors the active portion of the unit is housed within a pressure-tight vessel to which moderator and/or coolant fluid is introduced under extremely high pressures of the order of from 1000 to 2500 lbs. per square inch. Because of the high pressures within these vessels, a failure thereof would have serious consequences in that the release of energy in the contained high pressure fluid would propel vessel fragments great distances and at high velocities. These fragments could endanger other reactor system equipment and the containment building. A vessel rupture could also result in the reactor's fuel elements being propelled from the vessel thereby presenting the danger of loss of emergency cooling effectiveness.

A nuclear reactor vessel construction has been proposed that is capable of minimizing the consequences of a vessel rupture in the event of a serious reactor accident. The proposed construction comprises a double containment structure including an inner vessel housing the active portion of the reactor and an outer vessel disposed in slightly concentrically spaced relation to the inner vessel. Means are provided to supply the inner vessel as well as the space existing between the two vessels with high pressure moderator and/or coolant fluid. The two vessels are each constructed so as to be strong enough to resist the contained fluid pressure in the event of failure of the other but, because the interstitial space between the two vessels contains the same high pressure fluid that is introduced to the inner vessel, the pressure differential between the two sides of the inner vessel is eliminated thus effectivly imposing the contained fluid pressure only on the outer vessel. By means of the proposed construction, therefore, during normal operation only the outer vessel is subjected to the danger of failure or rupture due to the contained internal fluid pressure. Moreover, because only a small quantity of fluid is contained in the space between the two vessels and is thereby exposed to the atmosphere upon rupture of the outer vessel, the amount of energy available to propel fragments of the failed vessel has been substantially reduced. Furthermore, because the inner vessel surrounds the reactor core, in the event of failure of the outer vessel it can be supplied with cooling water to remove reactor decay heat.

In spite of the manifest advantages derived from a reactor vessel construction of the herein described type, problems arise as a result of the need for such structures to be suspendedly mounted within an enclosing foundation. In double containment reactor vessels heretofore known, it has been the practice to vertically support the outer vessel from radial support members on the foundation that engage the coolant nozzles which extend radially from the wall of the vessel. Support for the inner vessel is provided by the inter-engagement between radial flange means on the inner vessel and an annular shoulder on the inner surface of the outer vessel. Because of this manner of support significant problems result. Since the points of support of the outer and inner vessels, must, of necessity, be disposed in vertically spaced relation with respect to one another, such that any failure in the outer vessel at a point between the attachment of the outer vessel to the foundation and the attachment of the inner vessel to the outer vessel will result in a tendency for the inner vessel to be ejected from the outer vessel due to the large force imbalance imposed on the lower end of the inner vessel.

The present invention is directed toward an improved form of double container reactor vessel structure that obviates the above-mentioned problems.

SUMMARY OF THE INVENTION

According to the present invention a double container reactor vessel is provided that includes concentrically disposed inner and outer pressure vessels each comprising a shell and closure cover having annular, radially extending flanges. The inner vessel is attached to the outer vessel by means of the inner vessel's shell and closure cover flanges being disposed in sandwiched relation between the shell and closure cover flanges of the outer vessel. The assembled structure is suspendedly mounted within the vessel cavity of a foundation structure by disposing the outer vessel's shell flange in rested engagement upon radially extending support members disposed annularly about the inner surface of the foundation. A lock ring that is releasably attached at its outer peripheral side to the foundation overlies the closure cover flange of the reactor vessel and prevents upward vertical movement thereof. Both the support members and the lock ring provide bearing surfaces whose radial dimensions overlap those of the shell and closure cover flanges of both the inner and outer vessels such that in the event of a failure of the outer vessel in any location the inner vessel is retained in its supported location and the inner vessel closure cover flange is held against the inner vessel shell flange by the support members and the lock ring.

By means of the herein described invention, the aforementioned problems associated with double container reactor vessels are alleviated. Due to the sandwiched connection of flanges and the overlapping relationship between the flanges and the bearing surfaces on the support members and the lock ring any failure occurring in the outer vessel, even in the area of the flanges, will not dislodge the inner vessel closure cover from its associated shell nor will it produce an expulsion of the inner vessel from the vessel cavity.

DESCRIPTION OF THE PREFERRED EMBODIMENT

Figure 1:
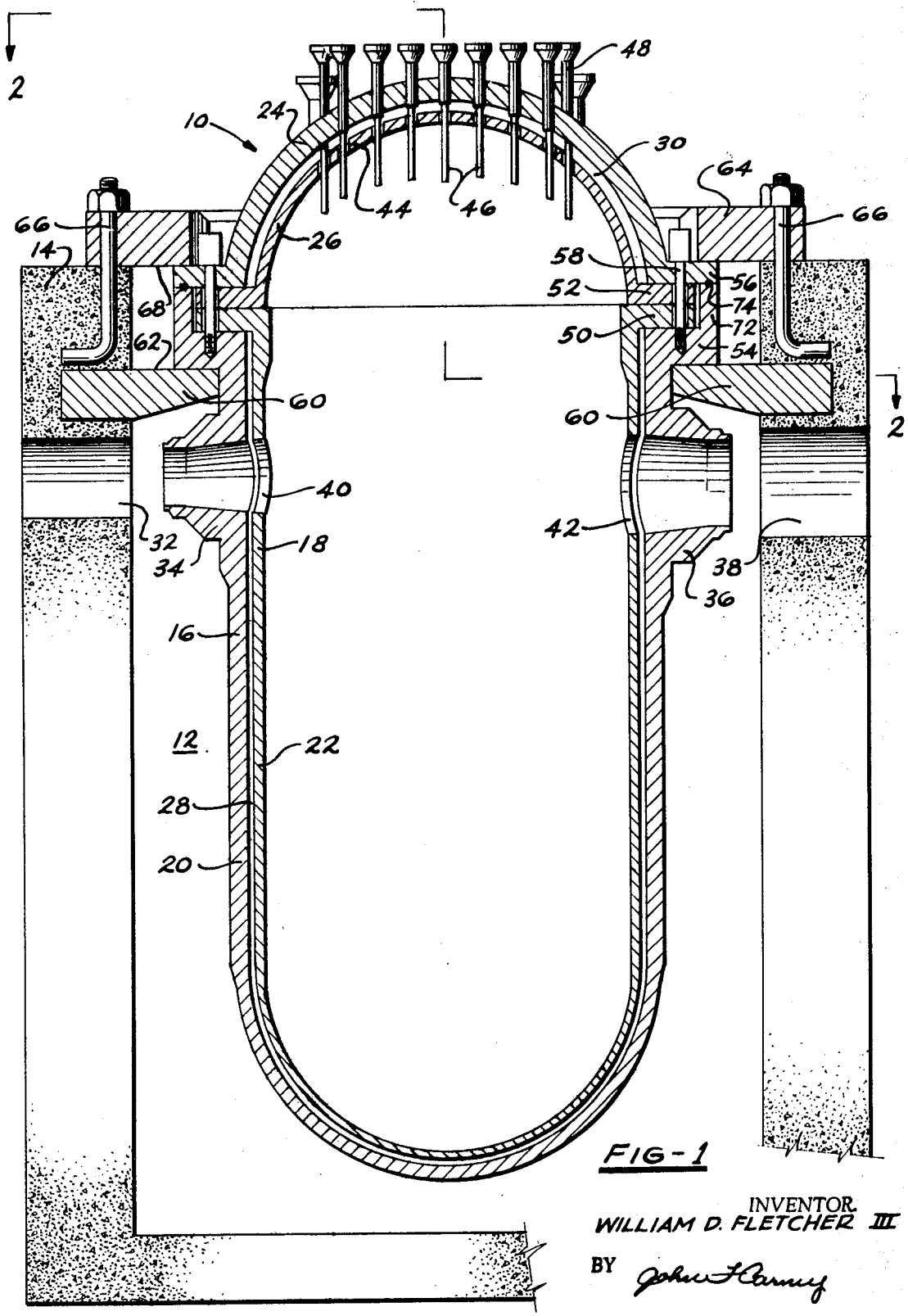
FIG. 1 is a vertical section of a double container reactor vessel constructed according to the invention.
Figure 2:
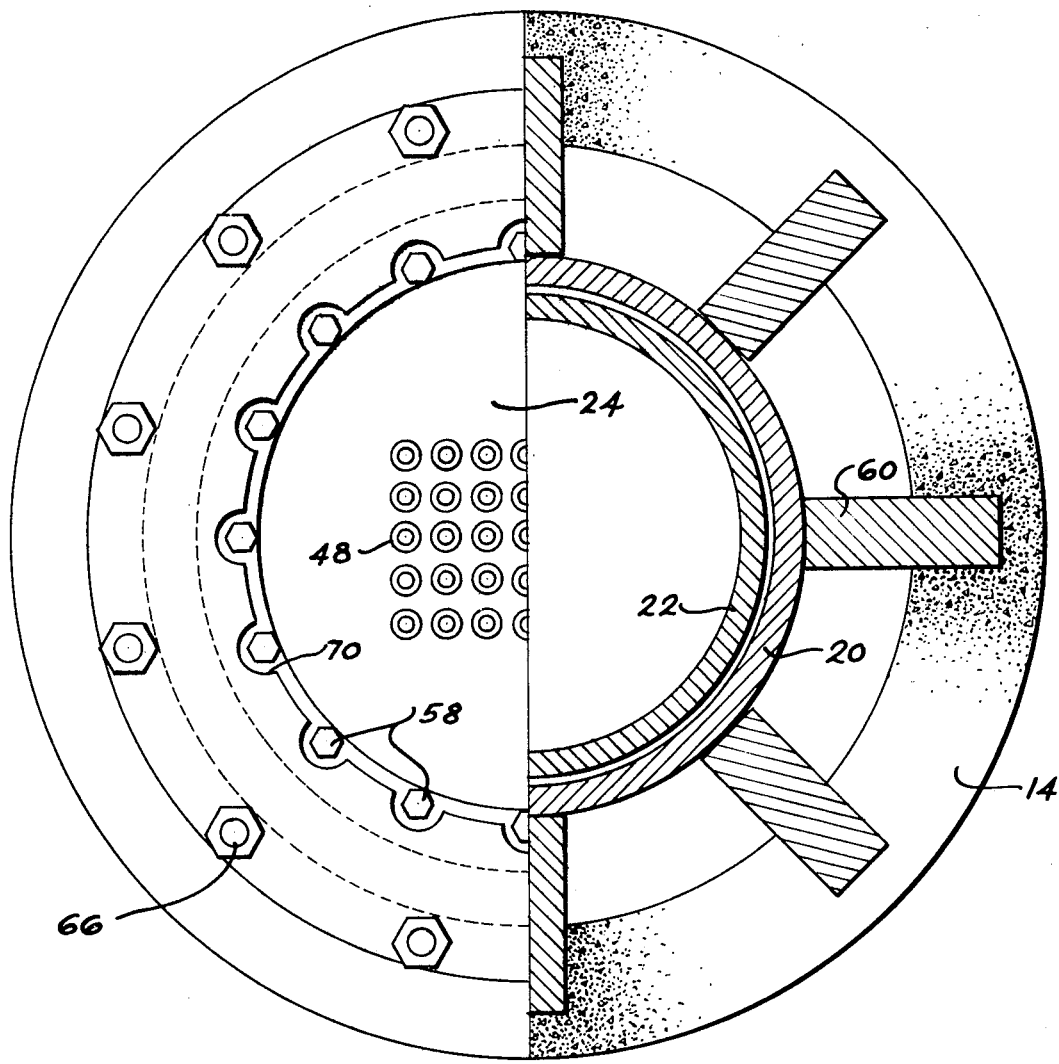
FIG. 2 is a plan section taken along line 2—2 of FIG. 1.

Referring to FIG. 1 of the drawings, there is illustrated a double container reactor vessel arrangement 10 according to the invention that is suspendedly mounted within a vessel cavity 12 in foundation structure 14. The reactor vessel arrangement comprises an outer container vessel 16 and an inner container vessel 18 enclosed within the outer vessel. The inner container vessel 18 is adapted to house the active portions of a nuclear reactor including the core, fuel elements, core support structure and various other associated apparatus which, for the reason that they are not germaine to the present invention, are neither shown nor described herein. The container vessels 16 and 18 each include generally cylindrical shells, 20 and 22 respectively, having closed lower ends and hemispherically formed closure covers 24 and 26 for closing the upper ends. The shells and closure covers of the respective vessels are mutually concentrically spaced to define intermediate spaces 28 and 30 that are relatively small in lateral extent as compared with the size of the vessels. For example, the width of the spaces 28 and 30 is contemplated as being of the order of from a fraction of an inch up to a few inches with the vessels being of the order of 15 or more feet in diameter and with wall thickness of about six to ten inches.

Means are provided to circulate coolant fluid under high pressure from outside the foundation structure 14 through the interior of the inner vessel 18 and further means are provided to place the intermediate spaces 28 and 30 in fluid communication with the interior of the inner vessel such that coolant circulation through the spaces is effected and, under normal operation, the fluid pressure in the inner vessel is the same as that in the intermediate spaces. A coolant inlet line (not shown) extends through opening 32 in foundation 14 and connects with inlet nozzle 34 that is attached to the outer surface of the shell 20 of the outer vessel 16. A similar outlet line (also not shown) connects with outlet nozzle 36 and extends through opening 38 provided in the foundation wall. The openings in the respective nozzles 34 and 36 communicate with the interior of the inner vessel 16 through radially aligned openings 40 and 42 in the inner vessel shell 22. Because the vessel shells 22 are concentrically spaced from one another, it will be appreciated that fluid communication will thereby also be established between the nozzle openings and space 28. Coolant circulation to the space 30 between the respective closure covers 24 and 26 is effected by means of adequate clearance provided in openings 44 in the closure cover 26 that pass control rod drive shafts 46, the latter being connected to appropriate drive mechanism located above the vessel and extending through mounts 48 that pass in sealing relation through outer vessel closure cover 24.

Operation of the arrangement thus far described is as follows. High pressure coolant liquid enters the inner vessel 18 through inlet nozzle 34 or outer shell 20 and openings 40 in inner shell 22 to seal the interior of the inner vessel. At the same time, the coolant liquid enters and fills the space 28 between the two shells due to the spacing between the opening 40 and the inner surface of the outer vessel 16. The space 30 is filled with liquid passed through openings 44 in the inner vessel closure cover 26. The circulating liquid passes through the reactor core (not shown) and exits the unit through opening 42 in the inner shell and outlet nozzle 36 on the outer shell. It will be appreciated that, due to the presence of the same high pressure liquid on both sides of the inner vessel shell 22 and closure cover 26, the differential pressure acting on that vessel will be negligible with the contained fluid pressure being effectively imposed only on the outer vessel shell 20 and closure cover 24. In the event of rupture of the shell 20 or closure cover 24 of the outer vessel 16 the amount of fluid energy available for propelling fragments of the failed vessel is limited to that released by the rapid expansion of the small amount of liquid contained in the affected space 28 or 30. The inner vessel, remaining intact, is able to temporarily hold coolant system pressure and, because the space between the inner and outer vessels through which the expanding liquid must flow is small, the pressure within the interior of the inner vessel will decay at a rate which is incapable of producing further fragmentation of the outer vessel.

According to the present invention means are provided to suspendedly mount the double container vessel arrangement 10 within the vessel cavity 12 of the foundation structure 14. As shown in the drawings, the inner vessel shell 22 and closure cover 26 are each provided with radially extending annular flanges 50 and 53, respectively, having opposing bearing faces adapted for mated engagement to close the interface between the shell and closure cover. The outer vessel shell 20 and closure cover 24 are similarly provided with radially extending annular flanges 54 and 56, respectively, whose opposing bearing faces are adapted to engage the underside surface of inner vessel shell flange 50 and upper surface of inner vessel closure cover flange 52. Assembly of the inner vessel shell and closure cover within the corresponding members of the outer vessel is established by placing the mated flanges 50 and 52 of the inner vessel components in sandwiched relation between the flanges 54 and 56 of the corresponding outer vessel components. The assembly of the two vessels with respect to one another is secured by means of a plurality of circumferentially spaced threaded fasteners 58 that extend through vertically aligned openings in the respective flanges and operate to apply a compressive sealing force therebetween.

The assembled vessel arrangement 10 is mounted to the foundation 14 by means of a plurality of radial support members 60 that are circumferentially spaced about the inner surface of the foundation 14 and which extend radially into the vessel cavity 12. The support members 60 in the disclosed arrangement are spaced below the upper end surface of foundation 14 and present upwardly facing bearing surfaces 62 forming shoulders adapted to engage the underside of the outer vessel shell flange 50 and thus suspend the assembly within the cavity 12. The support members 60, and thus the bearing surfaces 62, are caused to extend radially into the cavity 12 a distance sufficient to underlie all of the flanges 50 through 56. An annular lock ring 64 is mounted upon the upper end surface of the foundation 14 by means of releasable, threaded fasteners 66 disposed at circumferentially spaced positions about the outer periphery of the ring. The lock ring 64 presents a bearing surface 68 superposed above and radially overlapping the outer vessel closure cover flange 52 to prevent upward movement thereof. The ring, and thus the bearing surface 68, extends radially to a position causing it to overlie all of the flanges 50 through 56. To accommodate the flange fasteners 58 the inner periphery of the lock ring 64 may be scalloped as shown at 70.

While not necessary to the herein described invention, the outer vessel shell flange 54 is preferably provided with an annular upstanding rim 72 having an upper end surface in coplanar relation with the upper face of the inner vessel closure cover flange 52. An annular sealing ring 74 is interposed between the upper end surface of the rim and the bearing face of the flange 52 to prevent leakage from the interior of the assembly. By means of this construction, the need for installing sealing gasket means between each of the flange interfaces is eliminated.

The above described mounting arrangement for a double container reactor vessel results in the following advantages. Because of the sandwiched relation existing between the inner and outer vessel flanges and the overlapping relationship between these flanges and the bearing faces of the radial support members and the lock ring, the positional integrity of the inner vessel is secured. The other vessel, which has the greatest potential of failure, can fail in any location, even in the area of either of the flanges 54 ar 56 without danger of dislodging the inner vessel from its mounted relation within the foundation. Should a rupture develop between either the outer vessel shell 20 or 24 and their respective flanges 52 or 54, thereby causing a fracture of the shell or closure cover from its associated flange, it will be evident that, due to the disclosed mounting means the flanges will remain intact between the support members 60 and lock ring 64. Since the vertical support of the inner vessel is produced by the interengagement of its flanges with these flanges it too will remain intact. By so insuring the positional integrity of the inner vessel, the danger of its ejection from the foundation in the event of dislodgment of the outer vessel closure cover is removed.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:

1. In nuclear reactor pressure vessel structure of the type including mutually concentrically spaced inner and outer pressure vessels, each comprising a vertical, generally cylindrical containment shell having a closure cover closing the upper end thereof, and means for introducing high pressure fluid to said inner pressure vessel and the space between said inner and outer pressure vessels, the improvement comprising means for suspendedly mounting said pressure vessel structure within a vessel foundation having a well for receiving said vessel structure, said means including:
    (a) radially extending annular flanges on the shell and closure cover of said inner pressure vessel having opposing faces arranged for mated engagement;
    (b) radially extending annular flanges on the shell and closure cover of said outer pressure vessel, said flanges having opposing faces engaging the mated flanges of said inner pressure vessel in sandwiched relation; and
    (c) means forming annularly disposed shoulders extending radially inwardly from the wall of said foundation well, said shoulders being in concentric overlapping relation with the shell and closure cover flanges of said inner and outer pressure vessels and having opposing faces for engaging the shell and closure cover flanges of said outer pressure vessel.

2. Apparatus as recited in claim 1 wherein said shoulder means includes an annular lock ring releasably attached at its outer periphery to said foundation and having a bearing face for engagement with said outer vessel closure cover flange.

3. Apparatus as recited in claim 2 including releasable fastening means disposed in circumferentially spaced relation about said outer vessel shell and closure cover flanges for applying a compressive force between said flanges to urge the faces of the inner vessel flanges into tight mated engagement.

4. Apparatus as recited in claim 3 wherein said outer vessel shell flange includes an integral, annular upstanding portion in enclosing, concentrically spaced relation with the mated flanges of said inner vessel, said upstanding portion having an upper bearing surface for engagement with the opposing face of said outer vessel closure cover flange, and sealing gasket means interposed between said upper bearing surface and said opposing face.

References Cited
UNITED STATES PATENTS

| | | | |
|---|---|---|---|
| 3,121,046 | 2/1964 | Trickett et al. | 176—87X |
| 3,282,459 | 11/1966 | Wilson | 220—3 |
| 3,356,588 | 12/1967 | Beliaev | 176—87 |
| 3,395,076 | 7/1968 | Ruppen, Jr. | 176—37X |

BENJAMIN R. PADGETT, Primary Examiner

H. E. BEHREND, Assistant Examiner

U.S. Cl. X.R.

176—38; 220—3, 10